United States Patent [19]

Yoshiura et al.

[11] Patent Number: 4,629,314

[45] Date of Patent: Dec. 16, 1986

[54] COPYING APPARATUS HAVING VARIABLE MAGNIFICATION OPERATION MEMORY FUNCTION

[75] Inventors: Shoichiro Yoshiura, Yamatokoriyama; Haruyoshi Migita, Nara, both of Japan

[73] Assignee: Sharp Kabushiki Kaisha, Osaka, Japan

[21] Appl. No.: 741,854

[22] Filed: Jun. 6, 1985

[30] Foreign Application Priority Data

Jun. 11, 1984 [JP] Japan ............................... 59-121003

[51] Int. Cl.[4] ............................................. G03B 27/52

[52] U.S. Cl. .................................... 355/55; 355/14 R

[58] Field of Search .................................... 355/55–59, 355/14 SH, 14 R, 14 C, 3 SH

[56] References Cited

U.S. PATENT DOCUMENTS

| | | | |
|---|---|---|---|
| 4,260,248 | 4/1981 | Murata et al. | 355/14 C X |
| 4,270,173 | 5/1981 | Suttler | 355/56 X |
| 4,277,163 | 7/1981 | Ikesue et al. | 355/56 X |
| 4,442,505 | 4/1984 | Takano | 355/14 R X |
| 4,514,080 | 4/1985 | Matsuzawa et al. | 355/14 C |

*Primary Examiner*—Richard A. Wintercorn
*Attorney, Agent, or Firm*—Birch, Stewart, Kolasch & Birch

[57] ABSTRACT

An improved copying apparatus provided with a variable magnification operation memory function, in which the data value setting operation is simplified in the case where the converted magnification copying work is repeatedly effected based on the same variable magnification operation data, and thus, working time is reduced, while generation of erroneous operation is prevented, with a reduction of running cost and an improvement of the working efficiency.

1 Claim, 3 Drawing Figures

COPYING APPARATUS HAVING VARIABLE MAGNIFICATION OPERATION MEMORY FUNCTION

BACKGROUND OF THE INVENTION

The present invention generally relates to a copying apparatus having a magnification converting function for copying an original document onto copy paper sheets on an enlarged or reduced scale, and more particularly, to a copying apparatus provided with a variable magnification operation memory function having means for storing variable magnification operation specifications or data including an original document size to be copied, a size of the set copy paper sheet, and a converting magnification, and means for effecting magnification conversion based on the stored variable magnification operation data applied as input.

Recently, as the diversification of functions for copying apparatuses proceeds for the purpose of higher commercial values, there have been commercialized copying apparatuses provided with variable magnification functions for copying an original document onto copy paper sheets of different sizes on an enlarged scale or a reduced scale. In the copying apparatus of the above type, for causing the variable magnification function to be effected, it is necessary to set the variable magnification operation data as input. For this purpose, the copying apparatus of this type is provided with such functions as automatically detecting definite or fixed original document sizes, and for inputting indefinite original document sizes through employment of index values or absolute values, and also, for calculating the converted magnification from the set original document size and copy paper sheet size so as to automatically control the lens position or paper feeding speed, etc., and thus, an operator is required to carry out operations equivalent to the respective functions in order to cause these functions to be effected. Moreover, since the number of operations is increased in proportion to the number of functions to be adopted, with a necessity for inputting lengths of lateral sides and longitudinal sides of original documents, especially when original documents of indefinite sizes are to be copied at converted magnifications, the operations therefor become extremely complicated.

Moreover, in the conventional copying apparatuses provided with such variable magnification functions, it is necessary to input the variable magnification operation data each time, even when the copying at the same variable magnification operation data is to be repeatedly effected, and by way of example, in a state where an operation in which a single sheet of an indefinite size original document kept for copying is copied onto copy paper sheets of A4 size at converted magnification, is effected several times a day, there has been such an inconvenience that complicated procedures must be repeated each time, thus requiring a long time for the variable magnification copying operation, with an increased possibility of erroneous functions, and a marked reduction of the working efficiency on the part of the operator.

SUMMARY OF THE INVENTION

Accordingly, an essential object of the present invention is to provide an improved copying apparatus provided with a variable magnification operation memory function, in which the data value setting operation is simplified in the case where the converted magnification copying work is repeatedly effected based on the same variable magnification operation data, and thus, working time is reduced, while generation of erroneous operations are prevented, with a reduction of running cost and an improvement of the working efficiency.

Another important object of the present invention is to provide a copying apparatus of the above described type which is simple in construction and stable in functioning at high reliability.

In accomplishing these and other objects, according to one preferred embodiment of the present invention, there is provided a copying apparatus having a magnification converting function, which is so arranged that a ratio in length, of a lateral side to a longitudinal side each for a size of a definite shape copy paper sheet, and also, for a size of a definite or indefinite shape original document to be copied, is calculated so as to specify a converted magnification from the result of the calculation obtained, for copying the definite or indefinite shape original document onto the definite shape copy paper sheet on an enlarged or contracted scale, and characterized in that there are provided a memory means for storing variable magnification operation data of the original document size to be copied, set copy paper sheet size and converting magnification, and a magnification converting means for effecting the magnification conversion based on the stored variable magnification operation data applied as input, with these means being arranged respectively to function by operating keys provided at an operating section of the copying apparatus.

By the above arrangement of the present invention, in the case where the copying at the converted magnification is to be repeated by the same variable magnification operation data, the procedure required for setting the various data values may be simplified for an efficient copying operation, while occurrence of erroneous functions can be prevented, with a reduction of running cost and an improvement of operating efficiency of the copying apparatus.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1A:
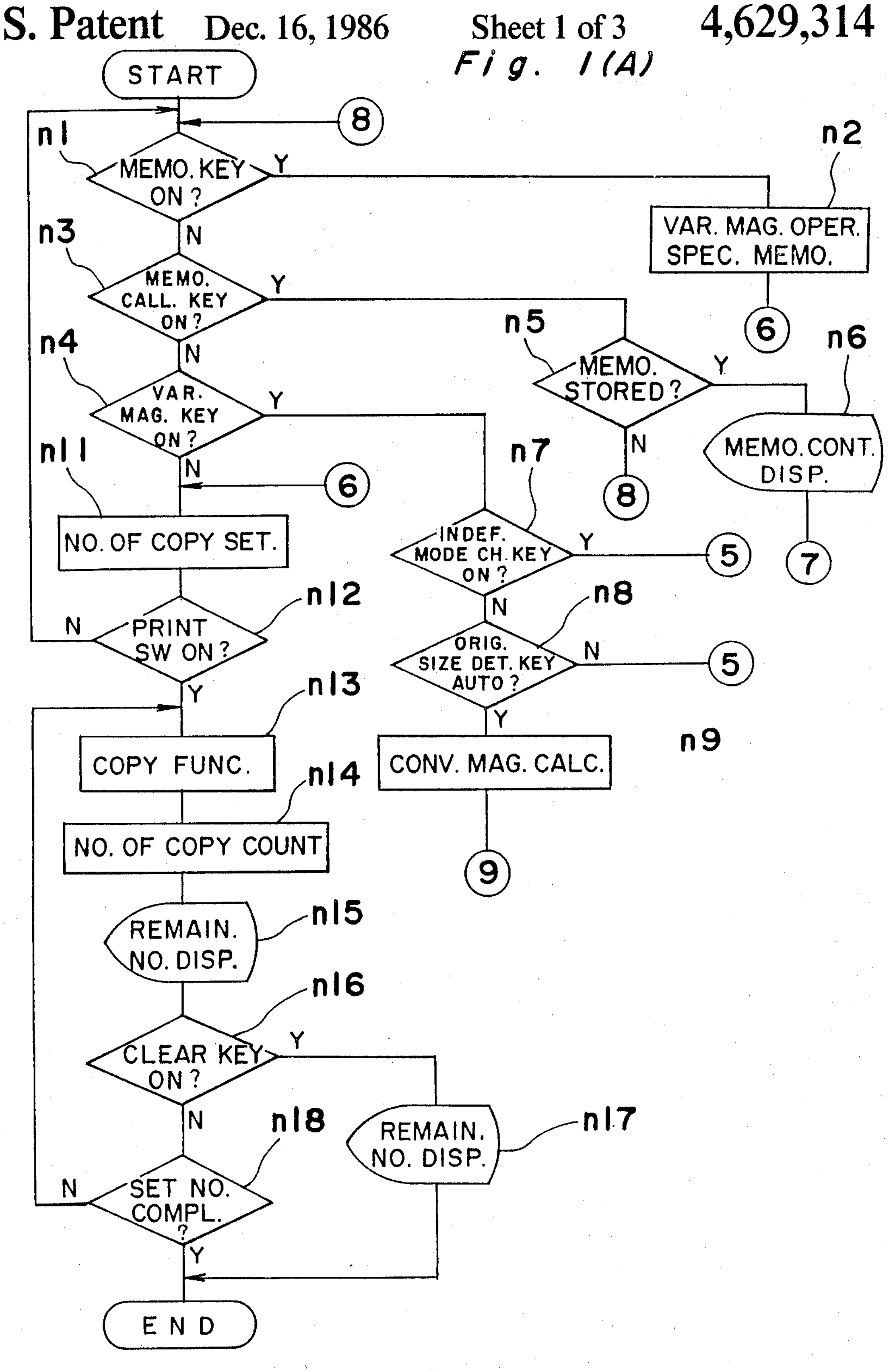
FIGS. 1(A) and 1(B) are flow-charts for explaining functions of a copying apparatus according to one preferred embodiment of the present invention.
Figure 1:
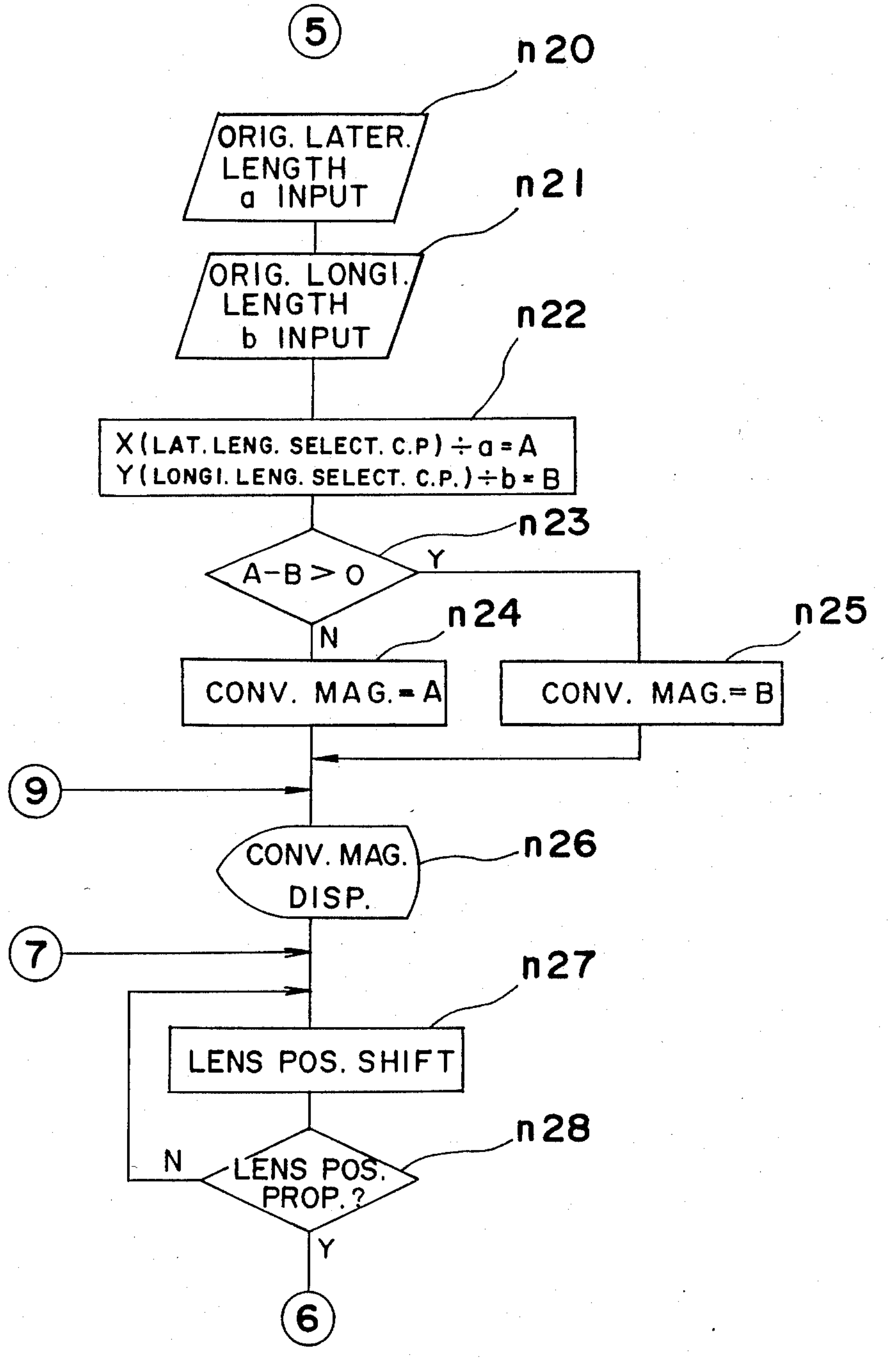

Before the description of the present invention proceeds, it is to be noted that like parts are designated by like reference numerals throughout the accompanying drawings.

Figure 2:
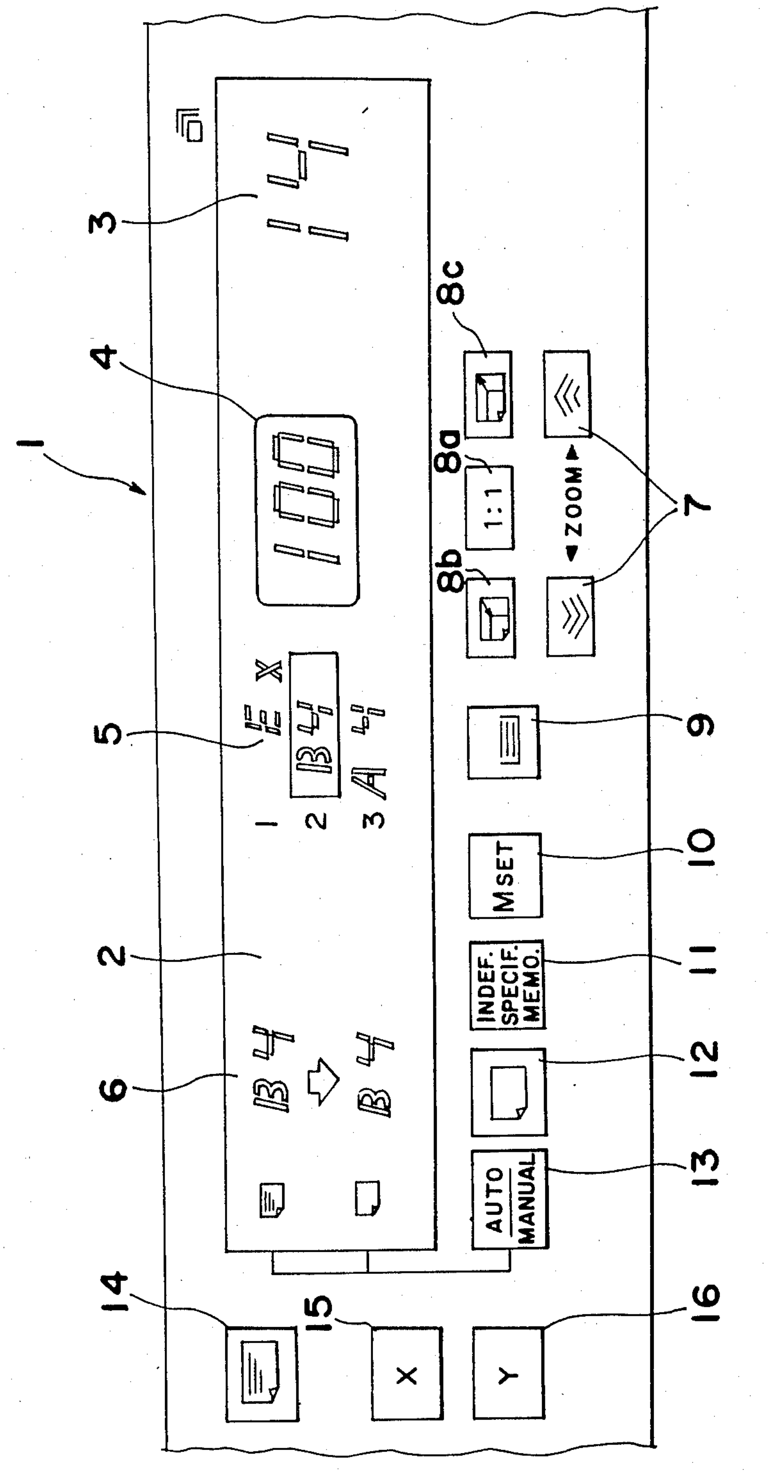
FIG. 2 is a fragmentary front elevational view of an operating section for the copying apparatus of FIGS. 1(A) and 1(B).

Referring now to the drawings, there is shown in FIG. 2, the main portion of an operating section or control panel 1 of a copying apparatus having a variable magnification operation memory function according to one preferred embodiment of the present invention.

In FIG. 2, the operation section 1 includes a display unit 2 at its upper portion, and at a numerical value display portion 3 provided at the right side end of the display unit 2, the number of copy paper sheets to be copied which is input by ten-keys (not shown), and lengths of lateral and longitudinal sides of original documents having an indefinite shape are displayed. On a converted magnification display portion 4 provided at the left side of the display portion 3, converted magnifications set by zoom keys 7 disposed thereunder or obtained by calculation are displayed, while copying operation selection keys or varied magnification keys 8*a* to 8*c* are provided directly below the display portion 4 for selection of reduction or enlargement for the copying. At the left side of the display portion 4, there is provided a copy paper sheet cassette display portion 5 for displaying copy paper sheet sizes as selected by a copy paper sheet cassette selecting key 9 provided thereunder. Adjacent to this key 9 at the left side thereof, is a memory set key 10 for storing the input variable magnification operation data, and a memory calling key 11 for calling out the data provided, and by the operation thereof, functions according to the present invention may be carried out. Upon operation of an original document size detecting key 13 provided below the left side end of the display unit 2, towards AUTO, the original document size can be detected by a sensor (not particularly shown) disposed at the lower portion of an original document platform of the copying apparatus so as to be displayed at the upper portion of an arrow in a converted size display portion 6 of the display unit 2. Meanwhile, the copy paper sheet size selected by a copy paper sheet size selecting key 12 provided at the right side of the original document size detecting key 13, is shown at the underside of the arrow in the converted size display portion 6. In the case where the original document size is of the indefinite shape, the numerical values displayed on the numerical value display portion 3 by the operation of the ten-keys may be input through operation of a lateral side length input key 15 and a longitudinal side length input key 16 disposed below an indefinite shape mode change-over key 14 after operating key 14.

Referring also to the flow-charts in FIGS. 1(A) and 1(B), copying functions of the copying apparatus of the above embodiment will be described hereinbelow.

In FIGS. 1(A) and 1(B), firstly in steps n1 and n3, a judgement is made as to whether or not the keys 10 and 11 related to the memory or calling out of the variable magnification operating data are operated, and if neither of the keys 10 and 11 are operated, it is judged at step n4 whether or not the varied magnification keys 8*b* (reducing key) and 8*c* (enlarging key) are operated. In the case where the copying operation is of the equal size magnification, the procedure proceeds to step n11 and the number of copies to be taken is set by the ten-keys. Upon operation of a print switch at step n12, the procedure advances in the order of steps n13→n14→n15 for effecting the copying operation, and the copying function is repeated until a clear key is operated at step n16 or the copying for the set number of copies is completed at step n18. At step n4, when the varied magnification copying operation is set through operation of the contracting key 8*b* or enlarging key 8*c*, the procedure jumps to step n7, where it is judged whether or not the original document to be copied is of an indefinite shape. In the case where the original document is of a definite size, with the indefinite shape mode change-over key 14 not being operated, judgement is made, at step n8, as to whether or not the original document size detecting key 13 is set to AUTO, and if it is in the state of AUTO, the original document size is automatically detected. Thereafter, at step n9, converted magnification is calculated based on the detected original document size and the copy paper sheet size selecting key 12 so as to be displayed on the display portion 4 at step n26, and the lens is displaced to a position corresponding to the converted magnification at steps n27 and n28. In the case where the print switch is not operated at step n12 after the number of copies is set at step n11, the program returns to step n1, and if the memory key 10 is operated here, the variable magnification operation data for the original document size, copy paper sheet size and converting magnification are memorized at step n2. At step n7, when the indefinite shape mode converting key 14 is operated and the original document to be copied is of an indefinite shape or the original document size detecting key 13 is in the MANUAL state, the lengths of the lateral side and longitudinal side of the original documents are input at steps n20 and n21. At step n22, calculations for $A=X\div a$ and $B=Y\div b$, wherein a and b respectively represent the above numerical values, and X and Y denote lengths of lateral and longitudinal sides of the selected copy paper sheet, are effected, and subsequently, the numerical values for A and B above are compared at step n23. If the value for A-B becomes zero or a negative number at step n23, the procedure is advanced to step n24 for setting the converted magnification to A, while if the value becomes a positive number at step n23, the converted magnification is set to B at step n25, and the procedure progresses in the order of steps n26→n27→n28→n11. At step n3, when the memory calling key 11 is operated, judgement is made at step n5 as to whether or not its content is stored in the memory, and if stored, the contents are displayed at step n6, and the procedure continues in the order of steps n27→n28→n11.

In the functionings as described so far, steps n1 and n2 correspond to the means for storing the variable magnification operation data according to the present invention, while steps n3, n5 and n6 are equivalent to the means for effecting the magnification conversion based on the variable magnification operation data as input.

It should be noted here that the above embodiment may further be so modified, for example, as to memorize a plurality of variable magnification operation data in order to reduce the operating time required during repeated copying operations for converted magnification copying in a plurality of kinds.

As is clear from the foregoing description, according to the present invention, especially when the copying at converted magnifications is to be repeatedly effected by the same variable magnification operation data, setting of the various data values may be simplified for efficient copying. Moreover, erroneous functionings of the apparatus can be eliminated, with simultaneous reduction of running cost and improvement of the operating efficiency.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A copying apparatus having a magnification converting function, which is so arranged that a ratio in length, of a lateral side to a longitudinal side is determined for a size of a definite shape copy paper sheet, and also, for a size of a definite or indefinite shape original document to be copied, said ratio being calculated so as to specify converted magnification from said calculation obtained, for copying said definite or indefinite shape original document onto said definite shape copy paper sheet on an enlarged or contracted scale, the improvement comprising:

memory means for storing variable magnification operation data of the original document size to be copied and for storing set copy paper sheet size and converted magnification; and magnification converting means for effecting a magnification conversion based on said input and stored variable magnification operation data.

* * * * *